(12) United States Patent
Shimomura

(10) Patent No.: US 8,978,873 B2
(45) Date of Patent: Mar. 17, 2015

(54) ARTICLE PROCESSING SYSTEM

(75) Inventor: Takashi Shimomura, Ishikawa-Ken (JP)

(73) Assignee: Shibuya Kogyo Co., Ltd., Kanazawa-shi, Ishikawa-ken (JP)

( * ) Notice: Subject to any disclaimer, the term of this patent is extended or adjusted under 35 U.S.C. 154(b) by 1377 days.

(21) Appl. No.: 12/319,319

(22) Filed: Jan. 6, 2009

(65) Prior Publication Data
US 2009/0188773 A1    Jul. 30, 2009

(30) Foreign Application Priority Data

Jan. 25, 2008    (JP) .................... 2008/14509

(51) Int. Cl.
*B65G 43/00* (2006.01)
*B65G 29/00* (2006.01)
*B65G 43/10* (2006.01)
*B65G 47/84* (2006.01)
*B67C 7/00* (2006.01)

(52) U.S. Cl.
CPC .............. *B65G 43/10* (2013.01); *B65G 47/846* (2013.01); *B67C 7/0013* (2013.01); *B67C 7/004* (2013.01)
USPC ...................................... 198/464.1

(58) Field of Classification Search
None
See application file for complete search history.

(56) References Cited

U.S. PATENT DOCUMENTS

| 3,724,642 A * | 4/1973 | De Good ................. 198/781.06 |
| 6,755,298 B1 * | 6/2004 | Heuft et al. .............. 198/370.07 |
| 2004/0011626 A1 * | 1/2004 | Hiramoto et al. .......... 198/478.1 |

FOREIGN PATENT DOCUMENTS

| DE | 297 24 903 | 10/2005 |
| JP | 63-006411 | 2/1988 |

* cited by examiner

*Primary Examiner* — Kavel Singh
(74) *Attorney, Agent, or Firm* — Flynn, Thiel, Boutell & Tanis, P.C.

(57) ABSTRACT

A filling system with a supply conveyor, an infeed screw, a supply star wheel for a rinser, a rinser, a discharge star wheel for a rinser, an intermediate star wheel, a supply star wheel for a filler, a filler, a delivery star wheel for a filler/capper, a capper, a discharge star wheel for a capper, and a discharge conveyor is provided. Each component has a revolving body such as a star wheel. In case an abnormality occurs in any component, a control unit activates a brake for that component, which stops the star wheel of the component forcibly, while controlling servomotors for all of the other components, thereby stopping the star wheel of all of the other components where the abnormality does not occur. Even in the event of the abnormality in any component, each component is stopped nearly simultaneously, so that the filling system can prevent damage to all of the components.

3 Claims, 2 Drawing Sheets

ARTICLE PROCESSING SYSTEM

FIELD OF THE INVENTION

The present invention relates to an article processing system and, in particular, an article processing system in which a plurality of units, each unit having a revolving body driven by a servomotor, are synchronized.

DESCRIPTION OF THE PRIOR ART

Conventionally, an article processing system is known which comprises a plurality of units, each unit comprising a revolving body driven by a motor, and control means for controlling the motor of each unit, synchronizing the units.

Since such an article processing system comprises the plurality of motors, instead of requiring a complicated driving mechanism to one motor to synchronize the plurality of revolving bodies, the system has to control rotation of the motor of each unit, synchronizing the plurality of revolving bodies.

An article processing system described in Japanese Patent Publication No. 63-6411 is known, which detects an operating speed and a phase of the motor in each unit as well as a gap of an operating timing between units, thereby controlling the above motors so as to eliminate this gap.

However, for the article processing system as shown in the above Japanese Patent Publication No. 63-6411, in case an abnormality occurs in the motor and/or a sensor for detecting its operating speed and the like in any unit, the system cannot control the motor of the unit where the abnormality has occurred, and therefore is not able to rotate the revolving body of the unit where the abnormality has not occurred in synchronization.

The system, therefore, cannot deliver an article successfully between the plurality of units as described in Japanese Patent Publication No. 63-6411, and the following problems arise: the article is caught therein to damage the unit, and this makes a subsequent recovery work complicated.

SUMMARY OF THE INVENTION

In view of the above problems, the present invention provides an article processing system that can prevent damage and the like to each unit by stopping each unit nearly simultaneously, even in the event of an abnormality in any unit.

An article processing system according to the present invention comprises: a plurality of units, each unit having a revolving body driven by a servomotor; and control means for controlling the servomotor of each unit to synchronize the units; wherein each of the units comprises a brake for stopping the revolving body, and the control means stores the stopping time for stopping the revolving body of each unit by the brake; and wherein in the event of an abnormality in any unit, the control means stops, by the brake, the revolving body of the unit where the abnormality has occurred and, simultaneously, controls the servomotors of the other units where the abnormality has not occurred, stopping the revolving body of each unit at the stopping time of the unit where the abnormality has occurred.

According to the above invention, even in the event of an abnormality in any unit, the article processing system can forcibly stop, by the brake, the revolving body of the unit where the abnormality has occurred.

On the other hand, for the other units where the abnormality has not occurred, since the control means stops the other units at the stopping time of the unit where the abnormality has occurred, all units constituting the article processing system are simultaneously stopped, so that the article processing system can prevent damage to the unit.

DETAILED DESCRIPTION OF THE EMBODIMENTS

Figure 1:
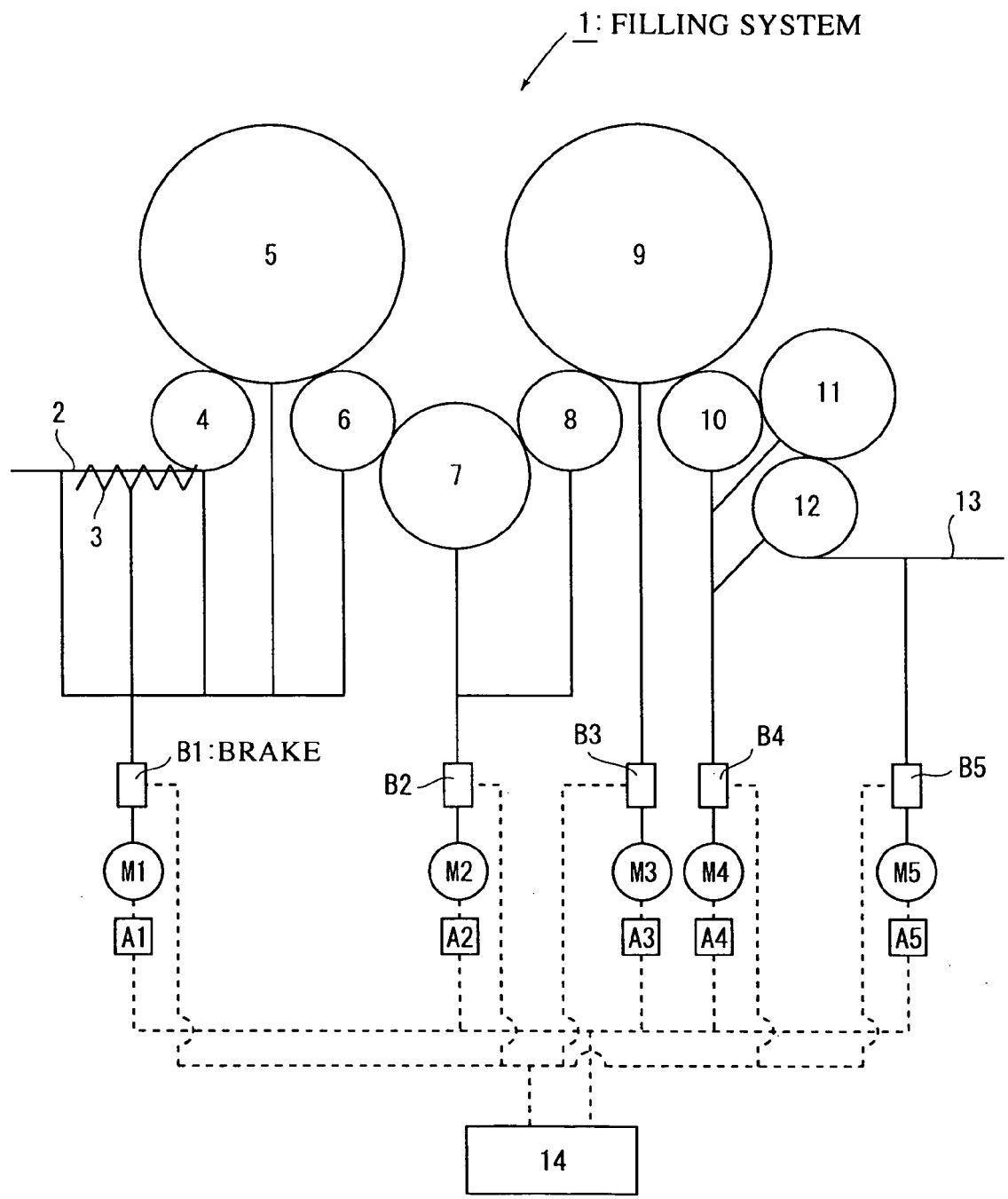
FIG. 1 is a schematic view of a filling system according to the embodiment.

The embodiments shown in the drawings will be described below. FIG. 1 shows a filling system 1 as an article processing system for filling a vessel as an article with a beverage.

The filling system 1 is composed of a plurality of units, each unit having a revolving body and comprises, in order from upstream, a supply conveyor 2, an infeed screw 3, a supply star wheel for a rinser 4, a rinser 5, a discharge star wheel for a rinser 6, an intermediate star wheel 7, a supply star wheel for a filler 8, a filler 9, a delivery star wheel for a filler/capper 10, a capper 11, a discharge star wheel for a capper 12, and a discharge conveyor 13, which are controlled by control means 14.

The supply conveyor 2 and the discharge conveyor 13 each comprise a sprocket (not shown) as the revolving body, and the rinser 5, the filler 9, and the capper 11 each comprise a star wheel as the revolving body.

The rinser 5 comprises a cleaning nozzle or the like (not shown) for injecting a cleaning solution into a vessel; the filler 9 comprises a filling nozzle or the like (not shown) for filling a vessel with a beverage; and the capper 11 comprises a capping head or the like (not shown) for screwing a cap onto a vessel.

The supply star wheel for a rinser 4 through the discharge star wheel for a capper 12 are each provided with a gripper (not shown) as an article retaining means, a vessel is delivered from a gripper of an upstream star wheel to a gripper of a downstream star wheel at a position where adjacent star wheels are in the vicinity of each other.

Note that since the configurations of the rinser 5, filler 9 and capper 11, and the gripper are previously, publicly known, their detailed descriptions will be omitted.

The filling system 1 drives uses first to fifth servomotors M1 to M5, which are controlled by the control means 14 through first to fifth servo amplifiers A1 to A5, respectively.

The first servomotor M1 drives the supply conveyor 2, the infeed screw 3, the supply star wheel for a rinser 4, the rinser 5, and the discharge star wheel for a rinser 6 through a transfer mechanism thereof, rotating the sprocket or star wheel of each unit in synchronization.

The second servomotor M2 rotates the intermediate star wheel 7 and the supply star wheel for a filler 8 in synchronization through a transfer mechanism thereof.

The third servomotor M3 rotates the star wheel of the filler 9 through a transfer mechanism thereof.

The fourth servomotor M4 drives the delivery star wheel for a filler/capper 10, the capper 11, and the discharge star wheel for a capper 12 through a transfer mechanism thereof, rotating the star wheel of each unit in synchronization.

The fifth servomotor M5 drives the discharge conveyor 13 through a transfer mechanism, so that the sprocket of the discharge conveyor 13 is rotated.

As above, for example, the sprocket and the star wheels of the supply conveyor 2, the infeed screw 3, the supply star wheel for a rinser 4, the rinser 5, and the discharge star wheel for a rinser 6 are rotated in synchronization by the first servomotor M1.

Since the discharge star wheel for a rinser 6 and the intermediate star wheel 7 are driven by different servomotors, the control means 14 needs to control the first and second servomotors M1 and M2, thereby rotating the discharge star wheel for a rinser 6 and the intermediate star wheel 7 in synchronization.

Therefore, the control means 14 outputs a required control pulse to the first to fifth servo amplifiers A1 to A5, and based on the control pulse, the first to fifth servo amplifiers A1 to A5 rotate the first to fifth servomotors M1 to M5, respectively.

The first to fifth servomotors M1 to M5 each comprises an encoder (not shown), and each encoder outputs a feedback pulse based on the rotation of a drive shaft of one of the first to fifth servomotors M1 to M5.

This feedback pulse is inputted into the first to fifth servo amplifiers A1 to A5, and the first to fifth servo amplifiers A1 to A5 adjust the rotational speeds of the first to fifth servomotors M1 to M5 based on the feedback pulse, respectively.

This rotates the sprocket or star wheel of the above each unit in synchronization, so that a vessel will be properly delivered therebetween.

The control pulse, for example, may be outputted based on a feedback pulse outputted from the encoder of the first servomotor M1, and alternatively a pulse of a pattern prestored in the control means 14 may be outputted.

The drive shafts of the first to fifth servomotors M1 to M5 are provided, respectively, with first to fifth brakes B1 to B5 that are respectively controlled by the control means 14. The first to fifth brakes B1 to B5 each can stop the star wheel or the like of each unit forcibly.

The first to fifth brakes B1 to B5 are provided on the drive shafts of the first to fifth servomotors M1 to M5, respectively, each brake comprising a brake disc that is rotated in conjunction with the drive shaft and a brake pad for generating a braking force by holding the brake disc from both sides. Such a brake is previously, publicly known.

When the first brake B1 is activated due to inability to control the first servomotor M1 for some reason, firstly, the control means 14 interrupts electric power to the first servomotor M1, then activates the first brake B1 after the drive shaft of the first servomotor M1 turns into a free running state to stop the first servomotor M1, and takes control to stop the second to fifth servomotors M2 to M5 at substantially the same time as the first servomotor M1.

Figure 2:
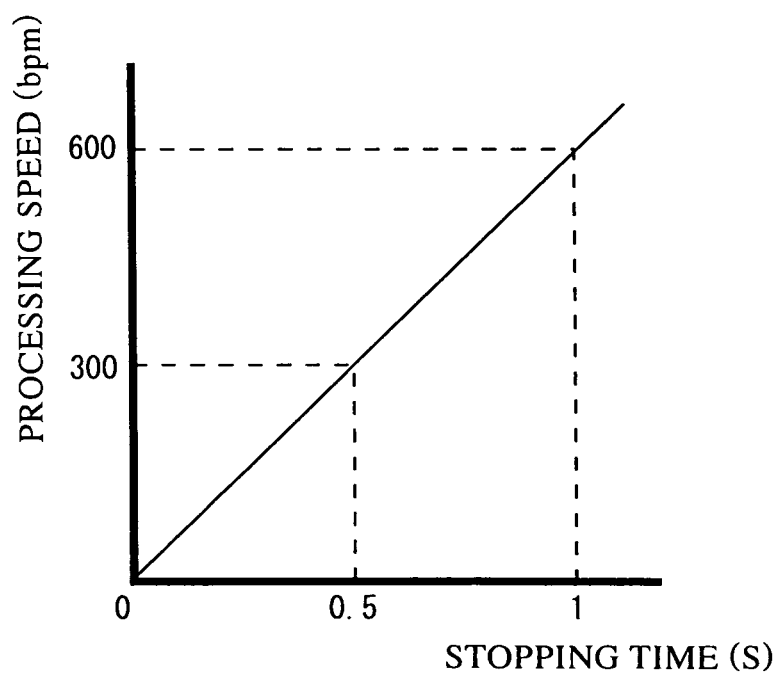
FIG. 2 is a graph illustrating a relation between a change in processing speed of a vessel in each unit and a corresponding change in stopping time of a revolving body caused by a brake, which is stored in control means.

The control means 14 stores a relation between a change in processing speed of the vessel and a change in stopping time of the star wheel or the like caused by the brake, as shown in FIG. 2. With the same processing speed, each unit is stopped at the same stopping time with the brake.

With vessels processed at 600 bpm in the filling system 1, for example, the first to fifth brakes B1 to B5 can stop the star wheels or the like of the units driven by the first to fifth servomotors M1 to M5 in about 1 second, respectively. With vessels processed at 300 bpm, i.e. half the speed thereof, they can stop the star wheels or the like in about 0.5 seconds.

Note that when the drive shaft of the servomotor turns into the free running state, the drive shaft is subjected to an inertia force resulting from the star wheel or the like that has rotated, and the inertia force, however, differs depending on the diameter and weight of the star wheel of each unit.

Therefore, the first to fifth brakes B1 to B5 are respectively set to different braking forces so as to establish the relation between the change in the processing speed and the change in the stopping time.

A method for controlling the filling system 1 having the above configuration will be described below.

Firstly, a state in which the filling system 1 normally operates will be described. The control means 14 controls the first to fifth servomotors M1 to M5 through the first to fifth servo amplifiers A1 to A5, respectively.

With this, each unit constituting the filling system 1 operates in synchronization, and for example, the discharge star wheel for a rinser 6 and the intermediate star wheel 7 are rotated in synchronization, and then a vessel will be delivered therebetween.

A vessel supplied to the supply conveyor 2 is then sequentially transferred to the infeed screw 3, the supply star wheel for a rinser 4, the rinser 5, the discharge star wheel for a rinser 6, the intermediate star wheel 7, the supply star wheel for a filler 8, the filler 9, the delivery star wheel for a filler/capper 10, the capper 11, and the discharge star wheel for a capper 12, in order, and during which cleaning of the vessel, filling of a beverage, and installation of a cap are performed. The vessel on which the cap is installed, then, is discharged to a downstream operation (not shown) with the discharge conveyor 13.

Secondly, in case an abnormality occurs in any unit, the control method will be described. As an example, in case it occurs in the filler 9, the method will be described.

The abnormality occurring in the filler 9 here means a case where the third servomotor M3 cannot be controlled, and there may be case where the feedback pulse is not obtained due to a failure of the encoder of the third servomotor M3, and no electric power is supplied to the third servomotor M3 in accordance with the control pulse from the control means 14 due to a failure of the third servo amplifier.

If the third servomotor M3 thus cannot be controlled by the control means 14, the control means 14 immediately interrupts the supply of electric power to the third servomotor M3.

This causes the drive shaft of the third servomotor M3 to turn into the free-running state, and the star wheel of the filler 9 driven by the third servomotor M3 continues its rotation by inertia.

Then, the control means 14 activates the third brake B3 provided on the drive shaft of the third servomotor M3, which stops the star wheel of the filler 9 forcibly.

The stopping time of the star wheel of the filler 9 with the third brake B3 is based on the relation shown in FIG. 2 and, for example, with a processing speed of 600 bpm when an abnormality occurs, the star wheel of the filler 9 is stopped in about 1 second by the third brake B3.

On the other hand, the control means 14 determines the stopping time of the star wheel of the filler 9 with the third brake B3 based on the relation shown in FIG. 2 and moreover instructs first, second, fourth and fifth servomotors M1, M2, M4 and M5 for driving the other units where the abnormality has not occurred to stop at the above stopping time.

Specifically, the control means 14 output a control pulse for stopping the servomotors M1, M2, M4 and M5 to the first, second, fourth and fifth servo amplifiers A1, A2, A4 and A5, while activating the third brake B3, thereby stopping the first, second, fourth and fifth servomotors M1, M2, M4 and M5 in about 1 second.

Thus, since the filler 9 where the abnormality has occurred and the other units where the abnormality has not occurred stop nearly simultaneously, the supply star wheel for a filler 8 and the delivery star wheel for a filler/capper 10, both being adjacent to the filler 9, will be stopped in substantial synchronization with rotation of the star wheel of the filler 9.

Accordingly, between the supply star wheel for a filler 8 where the abnormality has not occurred and the star wheel of the filler 9 where the abnormality has occurred as well as between the star wheel of the filler 9 where the abnormality has occurred and the delivery star wheel for a filler/capper 10 where the abnormality has not occurred, the filling system 1 can prevent a vessel from being caught therein in delivery positions, and prevent damage to the gripper.

Moreover, since the units constituting the filling system 1 are stopped in substantial synchronization, even when the filling system 1 is restarted, it is unnecessary to perform complicated work therefor.

In the above embodiment, though the braking forces of the first to fifth brakes respectively differs so as to stop each unit at the same stopping time in case of the same processing speed, the braking forces of the first to fifth brakes may be similar.

In this case, due to difference in inertia force acting on the star wheel or the like of the above each unit, in case of the same processing speed, each unit is stopped at a different stopping time by the brake.

Then, the control means 14 is designed to store the relation between the change in the processing speed of a vessel and the change in the stopping time of the star wheel or the like caused by the brake for each unit.

For example, when in case of an abnormality occurs in the filler 9 and then the third brake stops the filler 9, the control means 14 determines the stopping time of the filler 9 from the processing speed of the filling system 1, the other units where the abnormality has not occurred are stopped at the stopping time of the filler 9.

The filling system 1 has been described in the above embodiment, and the present invention however may be applied to another article processing system composed of a plurality of units, each unit having a revolving body driven by a servomotor, the system operating these units in synchronization.

What is claimed is:

1. An article processing system, comprising:
   a plurality of units, each unit having a revolving body driven by a servomotor and a brake for stopping the revolving body; and
   control means for controlling the servomotor of each unit to synchronize all the units with each other, the control means storing a stopping time for stopping the revolving body of each unit by the brake of each unit,
   wherein when an abnormality occurs in any unit, the control means stops, by the brake of the unit having the abnormality, the revolving body of the unit where the abnormality has occurred, and simultaneously controls the servomotors of the other units where the abnormality has not occurred, to stop the revolving body of each unit almost simultaneously with the stopping of the unit where the abnormality has occurred.

2. The article processing system according to claim 1, wherein the control means stores a relation between a change in a processing speed of an article in each unit and a change in the stopping time of the revolving body caused by the brake depending on a rotational speed of the revolving body at the time, and in the event of an abnormality in any unit, the control means stops the unit at a stopping time corresponding to a processing speed of the unit at the time.

3. The article processing system according to claim 1, wherein each unit comprises a star wheel as the revolving body driven by the servomotor, and article retaining means provided in the star wheel for gripping an article;
   wherein in a position where the star wheel of each unit is adjacent to the star wheel of another unit, the article is delivered from the article retaining means of one of the star wheels to the article retaining means of another star wheel; and
   when the revolving body of the unit where the abnormality has occurred is stopped by the brake, the control means controls the servomotors of the units where the abnormality has not occurred, to stop the star wheels of the units where the abnormality has not occurred while rotating the units where the abnormality has not occurred so as to be synchronized with the unit where the abnormality has occurred, so that the article retaining means can deliver the article.

\* \* \* \* \*